United States Patent [19]

Kraus et al.

[11] 4,182,124
[45] Jan. 8, 1980

[54] GRAVITY AUGMENTED AIR COMPRESSION TURBINE POWER PLANT

[76] Inventors: Robert A. Kraus; Edmund J. Kraus, both of 14160 Redhill, #39, Tustin, Calif. 92680

[21] Appl. No.: 819,967

[22] Filed: Oct. 5, 1977

Related U.S. Application Data

[63] Continuation-in-part of Ser. No. 763,498, Jan. 28, 1977, abandoned.

[51] Int. Cl.² ............................. F02C 1/02; F02C 1/04
[52] U.S. Cl. ........................................ 60/398; 60/682; 60/721
[58] Field of Search ................. 60/650, 682, 641, 398, 60/721

[56] References Cited

U.S. PATENT DOCUMENTS

| | | | |
|---|---|---|---|
| 3,375,664 | 4/1968 | Wells, Jr. | 60/682 X |
| 3,436,908 | 4/1969 | Van Delic | 60/641 |
| 4,022,024 | 5/1977 | Abeles | 60/682 X |

*Primary Examiner*—Allen M. Ostrager

[57] ABSTRACT

A power-producing device, comprising a vertically oriented chamber of enormous height, incorporating within its upper end an electric motor-driven, aftercooled air compressor, being connected via suitable power transmission, to an electric generator driving, reheated air turbine, located within the lower chamber end. Atmospheric air is compressed at a given rate of flow to a given pressure into the upper chamber end, which, due to the gravitational force exerted on its compressed mass, and due to the chamber height, is expanded within the turbine at the lower chamber end at an equal rate of flow, but, at a substantially higher pressure, and at a substantial gain in energy, thus, producing a substantially greater amount of work than is consumed by the compressor.

10 Claims, 1 Drawing Figure

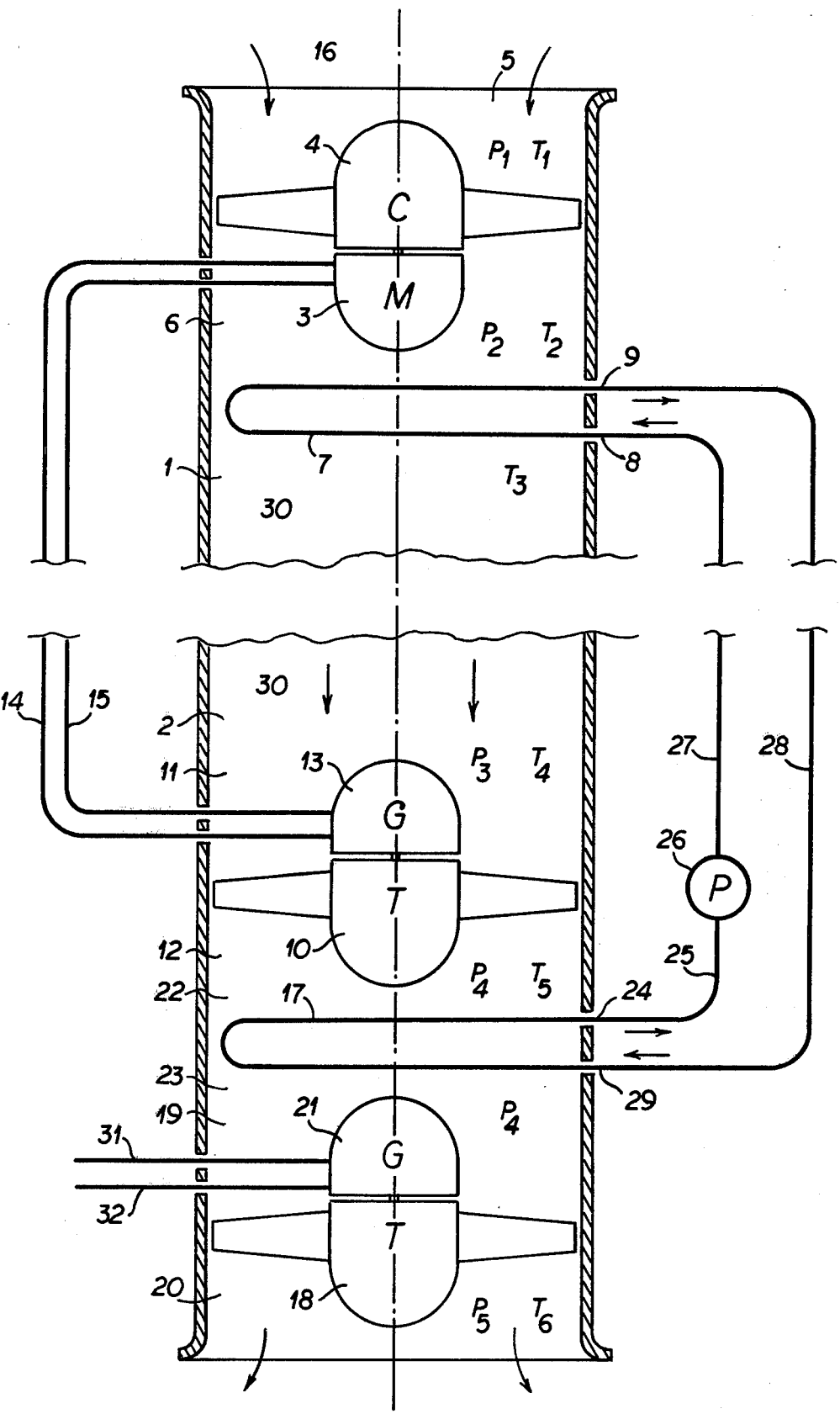

GRAVITY AUGMENTED AIR COMPRESSION TURBINE POWER PLANT

This application is a continuation in part of our earlier application, filed at the United States Patent Office on Jan. 28, 1977, with the title "GRAVITY INDUCED AIR COMPRESSION POWER PLANT", having the Ser. No. 763,498, which is now abandoned.

FIELD

This invention will find its use in the abundant and dependable, as well as environmentally safe and pollution-free production of cheap electrical power without the expenditure of non-renewable energy sources.

OBJECTS

Accordingly, it is an object of our invention to provide a means for the continuous maintenance of a vertically confined, downward-flowing column of air at substantially higher than atmospheric pressure; which, due to its column weight as a function of its compression, its cooling and its height, produces a substantial gravitational energy potential.

Another object of the invention is to provide an environmentally safe and non-polluting scheme for the generation of cheap electrical power, without the conversion and the expenditure of non-renewable energy sources.

Yet another object of the invention is to provide a power-producing device which is free of the limitations inherent in conventional power-producing systems.

These and other objects become apparent through the study of the appended specification and drawing.

DESCRIPTION OF THE DRAWING

The drawing illustrates a diagrammatical side view of the power-producing device's uppermost and its lowermost portion, comprising the vertically but not necessarily perpendicular to the horizon oriented air receiver chamber portions 1 and 2 respectively, having, for practical reasons, the major portion of its tubular center section not shown. The drawing shows, however, the composite arrangement of all basic components necessary for the explanation of the device's concept of operation, excluding control and starting means, as well as certain structural components necessary for the implementation of an operational device.

Wherein the air receiver chamber's enormous height, which, may be several thousand feet, represents a most important factor in the device's concept of operation. Hence, in the drawing, the excluded portion of the air receiver chamber is that portion of the device wherein the non-power-consuming, by gravitational downward attractive force generated recompression of the compressor-compressed air takes place. The uppermost portion 1 houses the electric motor 3 driven air compressor 4, incorporating the atmospheric air inlet 5, and the compressor air discharge 6; as well as houses the compression-heat removing aftercooler heat exchanger 7, incorporating the cooled heat-transfer fluid inlet 8, and the heated heat-transfer fluid outlet 9.

The lowermost portion 2 houses the primary power-producing high-pressure air turbine 10, incorporating the high-pressure air inlet 11, and the expanded air outlet 12, as well as its mechanically coupled electric generator 13; which is electrically connected via suitable power transmission means 14 and 15 to the electric motor 3, thus forcing the primary air turbine 10 and the air compressor 4 to work synchronized together as a unit. The total, by the primary air turbine 10 produced power, is utilized in the driving of the air compressor 4 in compressing the atmospheric air 16 from its initial pressure $P_1$ at the temperature $T_1$, to the compressor discharge pressure $P_2$ at the temperature $T_2$. The lowermost portion 2 further houses the air reheater heat exchanger 17 located between the primary high-pressure air turbine 10 and the secondary power-producing low-pressure air turbine 18, which incorporates, the reheated air inlet 19, and the expanded air outlet to atmosphere 20, as well as the mechanically coupled electrical generator 21, whose function it is to produce the system's net electrical power output, which is distributed via the power transmission means 31 and 32.

The air reheater heat exchanger 17 incorporates the primary turbine exhausted and by expansion cooled air inlet 22 and the heated air outlet 23, as well as incorporates the cooled heat-transfer fluid outlet 24 which is fluid communicatively connected via piping 25, the cooled heat-transfer fluid pump 26 and the piping 27, to the cooled heat-transfer fluid inlet 8 of the aftercooler heat exchanger 7, and the heated heat-transfer fluid outlet 9 of the aftercooler heat exchanger 7, is fluid communicatively connected via piping 28, to the heated heat-transfer fluid inlet 29 of the air reheater heat exchanger 17, so as to form a closed heat-transfer fluid recirculating cycle from the aftercooler heat exchanger 7 within the uppermost portion 1, to the air reheater heat exchanger 17 within the lowermost portion 2, and vice versa.

The cooling effect, generated in the power-producing expansion of the compressed air within the primary high-pressure air turbine 10, from the primary turbine inlet pressure $P_3$ at the temperature $T_4$, to the intermediate pressure $P_4$ at the temperature $T_5$, at the device's lowermost portion is utilized within the reheater heat exchanger 17 in the cooling of the heat-transfer fluid, which, cooled heat-transfer fluid is pumped upward to be utilized within the aftercooler heat exchanger 7, in the cooling of the compression-heated air, from the compressor discharge temperature $T_2$ to the aftercooler exhaust temperature $T_3$, while the compression heat being removed from the compression-heated air within the aftercooler 7 at the device's uppermost portion is utilized within the air reheater heat exchanger 17 at the device's lowermost portion, in the constant pressure heating of the primary turbine exhausted air, before entering the secondary electric generator driving low-pressure air turbine 18, for its final power-producing expansion from the intermediate pressure $P_4$, at the temperature $T_6$ to the atmospheric pressure $P_5$ at the temperature $T_7$.

The device's operation bases on the continuous maintenance of a vertically confined, between the compressor air discharge 6 and the primary turbine air inlet 11 at substantially higher than atmospheric pressure downward-flowing column of compressed air at substantially increased density.

The increase in air density is accomplished, partially through the mechanical compression of atmospheric air 16, within the motor-driven air compressor 4, from the compressor inlet pressure $P_1$ at the temperature $T_1$ to the compressor discharge pressure $P_2$ at the temperature $T_2$, and partially through its cooling within the aftercooler heat exchanger 7, from the compressor discharge temperature $T_2$ to the aftercooler exhaust temperature $T_3$.

Most of the compressor 4 consumed work is stored in the compressed air in form of its elevated pressure $P_2$, the major portion of which will be available again for the driving of the air compressor 4 in the compressed air's power-producing expansion within the primary air turbine 10.

Since, the device encounters frictional, as well as heat losses during operation, the compressed air's power-producing expansion from the compressor discharge pressure $P_2$ to atmospheric pressure $P_5$ within the primary and secondary air turbine, is not sufficient to sustain the operation of the compressor, and to produce the device's net generated power output.

Thus, it becomes apparent that some form of energy must be supplied to the compressor discharged air at the pressure $P_2$ before its entering the primary turbine 10. The compressor discharged air at the pressure $P_2$ must be sufficiently modified without the expenditure of mechanically-produced work to attain the substantially higher turbine inlet pressure $P_3$, so that the primary high-pressure air turbine and the secondary compression heat-recuperating low-pressure air turbine may generate in the expansion of the compressed air from the turbine inlet pressure $P_3$ to the atmospheric pressure $P_5$, a substantially greater amount of power than is necessary in the compression of the atmospheric air from its initial pressure $P_1$, to the compressor discharge pressure $P_2$.

Wherein the remaining, over and above the compressor-consumed power in the compression of the atmospheric air from its initial pressure $P_1$ to the compressor discharge pressure $P_2$ is the device's net power output produced by the secondary turbine 18.

The necessary energy, in its magnitude sufficient to modify the compressor 4 compressed, and by the aftercooler 7 cooled air, from the compressor discharge pressure $P_2$, to the substantially higher primary turbine inlet pressure $P_3$, represents itself in the sideproduct, as a conseqence of the atmospheric air's increase in density through the process of its mechanical compression and the process of its cooling which, in turn, generates a substantial gravitational energy potential of the downward-flowing column of compressed and cooled air, whose magnitude is a function of the extent of the atmospheric air's compression from the initial pressure $P_1$ at the compressor inlet temperature $T_1$ to the compressor discharge pressure $P_2$ at compressor discharge temperature $T_2$, the extent of its cooling from the compressor discharge temperature $T_2$ to the aftercooler exit temperature $T_3$, and the extent of the height between the compressor air discharge port 6 and the primary turbine air inlet port 11. Said gravitational energy potential manifests itself as a non-power-consuming, progressively from the compressor discharge pressure $P_2$ to the primary turbine inlet pressure $P_3$ downwardly increasing pressure rise.

The gravity-augmented pressure modification from the compressor discharge pressure $P_2$ to the primary turbine air inlet pressure $P_3$, as well as its conversion into a substantial net, usable power output, is the essence and the subject matter of our invention herein.

The foregoing description is to be understood as given by way of illustration and example only. The spirit and scope of this invention are limited solely by the appended claims.

What is claimed is:

1. A power-producing device, comprising a vertically oriented chamber having at least one air inlet at its upper end, and having at least one air outlet at its lower end; said chamber being of sufficient height to allow gravitational downward attractive force exerted on the steady downward-flowing column mass of compressed air within said chamber, to produce a gravitational energy potential in the form of increased column weight, which, when converted into work is sufficient to sustain the device's operation and to produce a substantial net generated power output; said device further comprises the following components, arranged in sequence from its upper to its lower end;
   a. at least one air compressor means;
   b. at least one aftercooler heat exchanger means located immediately downstream of said air compressor means having a cooled heat-transfer fluid inlet and a heated heat-transfer fluid outlet, said air compressor and said aftercooler heat exchanger means being fluid communicatively connected from atmosphere to within the upper chamber portion;
   c. at least one primary power-producing air turbine means;
   d. at least one air reheater heat exchanger means located immediately downstream of said primary air turbine means having a heated heat-transfer fluid inlet and a cooled heat-transfer fluid outlet;
   e. at least one secondary power-producing, electric generator driving air turbine means located immediately downstream of said air reheater heat exchanger means; said primary air turbine, said air reheater heat exchanger and said secondary air turbine means being fluid communicatively connected from within the lower chamber portion to atmosphere.

2. A power-producing device as in claim 1, comprising a electric motor being rotatably coupled to said air compressor means;
   and further comprising a primary electric generator means being rotatably coupled to said primary power-producing air turbine means;
said electric motor means and said primary electric generator means being electrically connected via suitable power transmission means, so as to allow said air compressor and said pimary air turbine means to work synchronized together as a unit;
   wherein the primary electric generator means-produced power being utilized in the driving of said electric motor coupled air compressor means.

3. A power-producing device as in claim 1, comprising an air pressure waste-gate means, including control valve and control means, being fluid communicatively connected from between said primary and said secondary air turbine means to atmosphere.

4. A power-producing device as in claim 1, wherein said aftercooler heat exchanger means and said air reheater heat exchanger means are fluid communicatively connected to each other via suitable piping and fluid pump means, so as to form a closed heat-transfer fluid cycle.

5. A power-producing device as in claim 1, comprising at least one suitable air shutoff means located within said chamber immediately downstream of said aftercooler heat exchanger means, providing a selective means for either the discontinuance or the continuance of the flow of air from within the upper chamber portion through said aftercooler heat exchanger means and said compressor means to atmosphere;

and further comprising a suitable air shutoff means located within said chamber immediately upstream of said primary air turbine means, providing a selective means for either the discontinuance or the continuance of the flow of air from within the lower chamber portion through said primary air turbine, said air reheater heat exchanger and said secondary air turbine means to atmosphere.

6. A power-producing device as in claim 1, wherein said primary and said secondary air turbine means are rotatably coupled to each other via suitable shaft means, so as to work together as a unit, having at least one electric generator means rotatably coupled thereto.

7. A power-producing device as in claim 1, comprising at least one low-pressure air compressor and at least one high-pressure air compressor means being rotatably coupled via suitable shaft means, so as to work together as a unit;

and comprising at least one intercooler heat exchanger means located immediately between said low-pressure and said high-pressure air compressor means, having a coolant inlet and a coolant outlet.

8. A power-producing device as in claim 1, operating on a steady flow, open, air power cycle, comprising the following processes:

a. The compressor-produced increase in the density of atmospheric air, through the process of its power-consuming compression from initial pressure and corresponding temperature to compressor discharge pressure, accompanied by its rise to corresponding higher temperature;

b. The subsequent increase in the density of the compressor-compressed air, through the process of its constant pressure cooling within said aftercooler heat exchanger means, from the compressor discharge temperature to the aftercooler exit temperature;

c. The gravity-produced, non-power consuming recompression of the compressor-compressed and cooled air, to substantially higher pressure, accompanied by its rise to corresponding higher temperature, through the process of gravitational compression work performed on the downward-flowing column mass of compressor-compressed and cooled air within said chamber;

d. The first power-producing expansion of the so compressed air within said primary air turbine means, from the primary turbine inlet pressure to intermediate pressure, accompanied by its corresponding drop in temperature;

e. The constant pressure heating of the primary turbine means-exhausted and expansion cooled air within said air reheater heat exchanger means, from the primary turbine exhaust temperature, to the reheater exit temperature;

f. The second power-producing expansion of the reheated air within said secondary air turbine means, from said intermediate pressure to atmospheric pressure, accompanied by its corresponding drop in temperature.

9. A power-producing device;

comprising a vertically oriented, chamber of enormous height, having at least one opening at its upper end and at least one opening at its lower end; incorporating within its uppermost portion the means for the increase in density of the atmospheric air through the process of its cooling to below atmospheric temperature;

wherein said increase in air density, produces the gravitational energy potential of the confined column of cooled air within said chamber;

and wherein said gravitational energy potential gives rise to an continuously maintained mass-flow of air from the device's uppermost portion through said chamber to atmosphere at the device's lowermost portion;

and incorporating, within its lowermost portion, the means for the conversion of the gravitational energy potential of said steady downward-flowing column of cooled air into useful work.

10. A power-producing device as in claim 9, wherein the magnitude of said gravitational energy potential is the consequence of the extent of the cooling of the air to below atmospheric temperature within said cooling means at the device's uppermost portion, and the extent of height between said cooling means and the means for the conversion of said gravitational energy potential into useful work at the device's lowermost portion.

* * * * *